Oct. 24, 1939.　　　A. G. LARSON　　　2,177,529
BRAKE CONTROL APPARATUS
Filed Nov. 18, 1937　　　4 Sheets-Sheet 2

INVENTOR
ARTHUR G. LARSON
BY Wm. M. Leady
ATTORNEY

Oct. 24, 1939.　　　A. G. LARSON　　　2,177,529
BRAKE CONTROL APPARATUS
Filed Nov. 18, 1937　　　4 Sheets-Sheet 3

INVENTOR
ARTHUR G. LARSON
BY　*Wm. M. Cady*
ATTORNEY

Oct. 24, 1939.　　　A. G. LARSON　　　2,177,529
BRAKE CONTROL APPARATUS
Filed Nov. 18, 1937　　　4 Sheets-Sheet 4

Fig. 7

INVENTOR
ARTHUR G. LARSON
BY *Wm. M. Cady*
ATTORNEY

Patented Oct. 24, 1939

2,177,529

UNITED STATES PATENT OFFICE 2,177,529

BRAKE CONTROL APPARATUS

Arthur G. Larson, Forest Hills, Pa., assignor to The Westinghouse Air Brake Company, Wilmerding, Pa., a corporation of Pennsylvania Application November 18, 1937, Serial No. 175,226

13 Claims. (Cl. 303—3)

This invention relates to vehicle brake control apparatus and has particular relation to brake control apparatus for a brake system including a plurality of types of brakes such as a fluid pressure operated brake, a magnetic track brake and a dynamic brake.

It has heretofore been proposed to provide brake control apparatus for car brake systems including a fluid pressure brake and one or more types of electrical brakes in which means is provided for preventing or suppressing application of the fluid pressure brakes as long as the electrical brakes are effective in excess of a predetermined degree. An example of such a brake control apparatus is that disclosed in the copending application, Serial No. 61,961 of Joseph C. McCune, filed February 1, 1936, and assigned to the assignee of the present application.

It is an object of my present invention to provide an improved control apparatus for brake systems of the above-indicated character, including a novel arrangement for controlling the fluid pressure brakes from the rear end of the car to enable the release and the reapplication of the fluid pressure brakes from the rear end of the car when it is desired to control the propulsion means of the car from the rear of the car, as in backing up.

Another object of my invention is to provide a control apparatus for brake systems of the above-indicated character including improved means for locking the fluid pressure brakes in application position and for effecting release of the fluid pressure brakes by control means located at the head end and at the rear end of the car, whereby control of the propulsion means of the car or train from either the head end or the rear end of the car may be effected.

The above objects, and other objects of my invention which will be made apparent in the subsequent description of my invention, may be attained by several illustrative embodiments of brake control equipments as shown in the accompanying drawings, wherein Fig. 4 illustrates a modification of the embodiment shown in Fig. 3, Figs. 5, 6 and 7 are fragmentary diagrammatic views illustrating, respectively, other embodiments of my invention as applied to the brake control equipment shown in Fig. 1.

Figure 1:
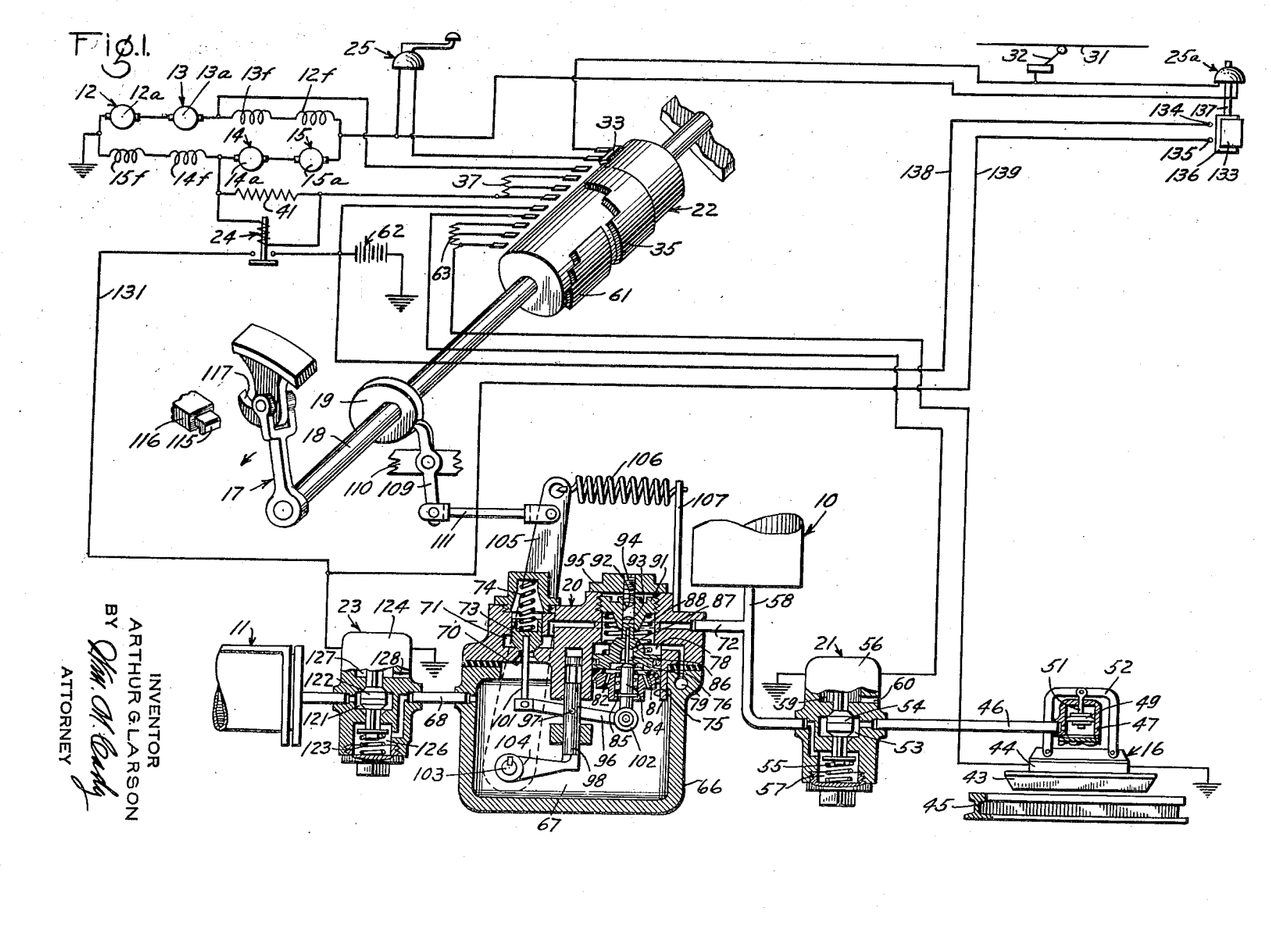
Fig. 1 is a diagrammatic view showing a brake control equipment for a fluid pressure brake, a magnetic track brake and a dynamic brake and including one embodiment of my invention.

Embodiment shown in Fig. 1

Referring to Fig. 1, the embodiment shown comprises a fluid pressure brake apparatus including a brake cylinder 11, a dynamic brake apparatus in which the propulsion motors 12, 13, 14 and 15 of the car are adapted to be connected to operate as generators in the usual manner well understood by those skilled in the art, and a magnetic track brake apparatus including a track brake device 16. All three brakes are controlled by operation of a single element, illustrated as a foot-pedal 17, which is effective to rotate a shaft 18. A cam 19 fixed on shaft 18 effects operation of a self-lapping valve mechanism 20 controlling the supply of fluid under pressure from a reservoir 10 to the brake cylinder 11 as well as the release of fluid under pressure from the brake cylinder. A controller drum 22 fixed on shaft 18 controls the propulsion motors 12 to 15 to effect dynamic braking and also controls application and release of the magnetic track brake device 16.

The equipment further includes a suppression magnet valve device 23 which is controlled according to the dynamic braking current through the medium of the relay 24 in the dynamic braking circuit. Motor controllers 25 and 25a at the head and rear end of the car, respectively, are provided for controlling the supply of driving power to the propulsion motors of the car. The motor controller 25a at the rear of the car or train is adapted also, according to my invention, to control the suppression magnet valve device 23 to effect release of the fluid pressure brakes from the rear end of the car.

Considering the parts of the equipment in greater detail, the propulsion motors 12, 13, 14 and 15 are illustrated as of the direct-current type comprising armatures or rotors 12a, 13a, 14a and 15a, respectively, and field windings 12f, 13f, 14f and 15f, respectively. For simplicity, the motors 12 to 15 are illustrated as connected normally in series-parallel relation, but it will be understood that the motors are connected and controlled in the usual manner.

The motor controllers 25 and 25a are connected by means of the simple circuit shown to control the supply of current to the propulsion motors 12 and 15, as from an external source, represented by the trolley wire 31 and the trolley 32, to control the direction of movement and the speed of the vehicle or the car.

Figure 2:
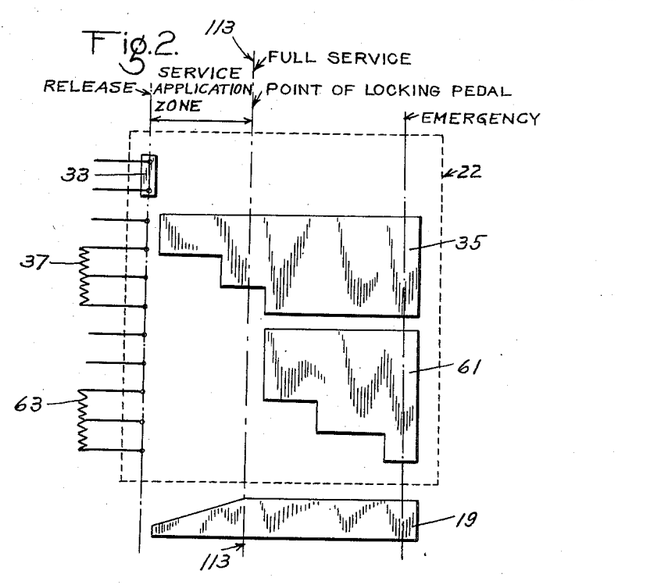
Fig. 2 is a diagrammatic development view of the controller drum shown in Fig. 1.

As indicated in Figs. 1 and 2, controller drum 22 is provided with a contact segment 33 thereon which is effective, when the foot-pedal 17 is depressed a slight degree from its normal position shown, to disconnect the motor controller 25 from the trolley 32 and thus interrupt the supply of power to the propulsion motors 12 to 15. It is contemplated that the motor controller 25a be used primarily to control the propulsion motors 12 to 15 to effect backing-up of the car. Since the car travels only at a low speed in backing-up so that the dynamic brake is ineffective, the connection between the trolley 32 and the motor controller 25a is not subject to the control of the controller drum 22 as is the motor controller 25.

As will be seen in Fig. 2, the controller drum 22 also has thereon a stepped contact segment 35 for completing the simple dynamic braking circuit shown, slightly after the segment 33 is moved to interrupt the supply of power to the motors.

Included in the dynamic braking circuit is a dynamic braking resistor 37, successively increasing portions of which are shunted out of the circuit by segment 35 upon rotation of the controller drum by depression of the foot-pedal 17.

Also included in the dynamic braking circuit is a resistor 41 across which the electromagnet winding of the relay 24 is connected. As long as the current in the dynamic braking circuit exceeds a certain uniform value, the voltage drop across the resistor 41 is sufficient to energize the winding of the relay 24 to actuate the movable contact member of the relay into circuit-closing position. When the current in the dynamic braking circuit falls below the said certain uniform value, the voltage drop across the resistor 41 is insufficient to maintain the contact member of relay 24 in circuit-closing position and the contact member accordingly is shifted by gravity or by a spring to circuit-opening position. The function of the relay 24 will be made more apparent hereinafter.

The magnetic track brake device 16 may comprise rail contacting shoes 43 and an associated electro-magnet winding 44, the shoes 43 being suspended normally a certain distance above an associated track rail 45 by means of a lifting cylinder 47 which has fluid under pressure supplied thereto from reservoir 10 through a pipe 46 and released therefrom under the control of a magnet valve device 21. The cylinder 47 contains a piston 49 having a stem 51 which extends exteriorly of the cylinder 47 and on which the shoes 43 are suspended by means of one or more U-shaped struts 52.

As long as fluid under pressure is supplied to the cylinder 47, the piston 49 is maintained in upper position so as to support the track brake shoes 43 a normal distance away from the track rail 45. When fluid under pressure is released from the cylinder 47, the shoes 43 fall, due to gravity, into contact with the track rail 45.

The magnet valve device 21 may comprise a casing having a chamber 53, which is constantly connected by the pipe 46 to the pressure side of the piston 49 in the cylinder 47, and a double beat valve 54 contained in the chamber 48 and normally urged to an upper seated position by a spring 55 and to a lower seated position, against the force of the spring 55, by an electromagnet 56. When in its upper seated position, as shown, the double beat valve 54 establishes communication between the chamber 53 and a chamber 57, which is constantly connected to the reservoir 10 by a pipe and passage 58, thereby causing fluid under pressure to be supplied to the cylinder 47 to raise the track brake shoes 43 out of contact with the track rail. When the double beat valve 54 is in its lower seated position, the supply communication just described is closed and a communication between the chamber 53 and a chamber 59 constantly connected to the atmosphere through an exhaust port 60 is established, thereby effecting the release of fluid under pressure from the cylinder 47 and the consequent dropping of the track brake shoes 43 into contact with the track rail.

Energization and deenergization of the electro-magnet winding 44 associated with the track brake shoes 43, and the electro-magnet 56 of the magnet valve device 21, is controlled by the controller drum 22, a stepped contact segment 61 being carried in insulated relation thereon for effecting the supply of current from a source, such as a battery 62, to the electro-magnet windings 44 and 56. A resistor 53, provided with suitable taps, is associated with the contact segment 61 on the controller drum in such manner that an increasing portion of the resistor 63 is shunted out as the controller drum is moved rotarily out of the position shown upon depression of the foot-pedal 17 to thereby effect an increase in the degree of current supplied to energize electromagnet winding 44 on the track shoe. It should be noted that the contact segment 61 on the controller drum 22 is so disposed in relation to the contact segment 35 on the controller drum as not to effect initial energization of the electro-magnet windings 44 and 56 until after the controller drum has been rotated sufficiently for the contact segment 35 to shunt out all of the dynamic brake resistor 37.

The self-lapping valve device 20 is of the type described and claimed in Patent 2,042,112 of Ewing K. Lynn and Rankin J. Bush and may comprise a sectional casing 66 having therein a chamber 67, hereinafter referred to as the pressure chamber, which is connected to the brake cylinder 11 through a pipe 68 in which the suppression magnet valve device 23 is interposed.

Also formed in the casing 66 is a chamber 71 which is constantly connected to and charged with fluid under pressure from the reservoir 10 by way of the pipe 58 and a branch pipe and passage 72. A supply valve 73 is contained in the chamber 71 and is normally yieldingly urged into seated relation on an associated valve seat by a spring 74 to cut off communication between the chamber 71 and the pressure chamber 67 through a port 70.

The casing has also a bore 75 containing a piston 76, the piston being subject on one side to fluid pressure in the pressure chamber 67 and having at the opposite side a chamber 78 which is constantly open to atmosphere through an exhaust port or passage 79. The piston 76 has formed therein a chamber 81 which is constantly connected to the pressure chamber 67 through one or more ports 82 in the piston 76.

A pin valve 84, hereinafter called the release valve, is contained in the chamber 81 and is normally yieldingly urged to an unseated position with respect to an associated valve seat on the piston 76 by a spring 85, to establish communication from the chamber 81 to the atmospheric chamber 78 through an axial bore 86 and one or more ports 87.

A coil spring 88 is contained in the chamber 78 and is interposed between the piston 76 and a threaded plug 91 screwed into the outer open end of the bore 75, the spring 88 being effective to urge the piston 46 inwardly of the bore 75 and to yieldingly oppose movement of the piston outwardly of the bore. The threaded plug 91 has an axial bore 92 which has a smooth inner portion and a threaded outer portion. The smooth inner portion of the bore 92 slidably receives the end of a stem 93 of the piston 76 and the threaded outer portion of the bore receives a stop screw 94 which is adapted to be engaged by the stem 93 of the piston to limit the movement of the piston outwardly of bore 75. A lock nut 95 may be provided on the outer end of the stop screw 94.

Operation of the supply valve 73 and the release valve 84 is effected by means of a so-called "floating" lever 96 which is pivoted intermediate its ends, as by a pin 97, on a plunger or stem 98 which is slidably mounted in the casing 66. One end of the lever 96 has pivotally attached thereto a rod or stem 101 which extends through the port 70 and engages in a recess in the face of the supply valve 73 at the inner seated area thereof. A roller 102 is provided at the opposite end of the lever 96 and engages the inner end of the release valve 84 which projects into the pressure chamber 67.

The plunger 98 is shifted axially to different positions by rotation of a rotary operating shaft 103 which is suitably journaled in the casing, an arm 104 being keyed or otherwise suitably fixed to the shaft 103 for engaging one end of the plunger 98 to effect shifting thereof upon rotation of the shaft 103.

The operating shaft 103 extends to the exterior of the casing 63 and has keyed or otherwise suitably fixed thereto an operating lever 105 which is yieldingly urged to a certain normal position, shown, by a coil spring 106 which is connected at opposite ends under tension to the lever 105 and a bracket or lug 107 fixed to the casing 66.

The lever 105 is shifted rotarily in a clockwise direction against the resistance of the spring 106, upon rotation of the foot-pedal-operated shaft 18, by means of the cam 19 on the shaft 18 which cooperates with one end of a lever 109 that is pivoted intermediate its ends on a fixed part 110 such as the frame of the vehicle, the opposite end of the lever 109 being connected by a link 111 to the lever 105. As will be more readily apparent in Fig. 2, the cam surface of the cam 19 increases in eccentricity, as the degree of depression of the foot-pedal 17 from its normal position increases and, when the foot-pedal 17 has been depressed a given amount so as to rotate the shaft 18 out of its normal position to a position corresponding to the broken line 113 and referred to hereinafter as the full service position, the eccentricity of the cam surface thereafter remains constant. Thus, upon depression of the foot-pedal 17, the operating lever 105 of the control valve device 20 is shifted through a predetermined angle only, notwithstanding the further depression of the foot-pedal 17 and the corresponding further rotation of the shaft 18.

When the operating lever 105 of the control valve device 20 is shifted in a counterclockwise direction, the plunger 98 is moved slidably upward a corresponding degree and, therefore, since the spring 74 urging the supply valve 73 into seated position is stronger than the spring 85 associated with the release valve 84, the floating lever 96 pivots in a counterclockwise direction on the stem 101, thus effecting seating of the release valve 84 on the piston 76. The spring 88 resisting outward movement of the piston 76 in the bore 75 is stronger than the spring 74 associated with the supply valve 73 and thus after the release valve 84 is seated on the piston 76 further movement of the plunger 98 upward results in the pivoting of the lever 96 in a clockwise direction about the end engaging the release valve 84, thereby unseating the supply valve 73 and causing fluid under pressure to be supplied therepast from the reservoir 10 to the pressure chamber 67.

The spring 88 is gradually overcome by the increasing fluid pressure in chamber 67 acting on the piston 76 and yields so that the spring 74 becomes effective to seat the supply valve 73. With the plunger 98 in a fixed axial position, the shifting of the supply valve 73 to seated position causes the floating lever 96 to pivot on the pin 97 and thus maintain the release valve 84 seated on the piston 76.

When the operating lever 105 is shifted a further degree in a counterclockwise direction, and the plunger 98 is correspondingly shifted a further degree upward, the supply valve 73 is again unseated to cause a further supply of fluid under pressure to the pressure chamber 67 to increase the pressure therein. As in the previous instance, when the pressure in the chamber 67 increases sufficiently to cause outward movement of the piston 76 against the yielding force of the spring 88, supply valve 73 is again seated.

It will thus be apparent that by suitably regulating the tension of the spring 88 by means of the threaded plug 91, the pressure established in the pressure chamber 67 will always be substantially in proportion to the displacement of the operating lever 105 out of its normal position in a counterclockwise direction. Since, as previously explained, the cam 19 is adapted to effect a maximum displacement of the operating lever 105 when the foot-pedal 17 reaches a full service position, it will be apparent that no further increase of the pressure in the pressure chamber 67 will be effected although the foot-pedal 17 may be depressed further beyond full service position.

When the operating lever 95 is returned toward its normal position within the application zone, the force holding the plunger 98 in position is relieved and consequently, spring 85 becomes effective to unseat release valve 84 to cause exhaust of fluid under pressure from pressure chamber 67 by way of exhaust port 79. As the pressure in the pressure chamber 67 reduces, the spring 88 acts to shift the piston 76 inwardly of the bore 75 and thereby effects reseating of the release valve on the piston at a time that the amount of reduction in pressure in the chamber 67 corresponds to the degree to which the operating lever 105 has been shifted back toward its normal release position.

When the operating lever 105 is shifted into its normal position shown, the spring 88 is ineffective to cause seating of the release valve 84 and consequently the exhaust communication through the port 79 is maintained to effect reduction of the pressure in the chamber 67 to atmospheric pressure.

In accordance with my invention, I provide means for locking the foot-pedal 17 in the full service position which is in the form of a projecting lug 115 secured to a fixed part 116, such as the frame of the vehicle, under which a hooked member 117 on the foot-pedal 17 is adapted to catch upon downward movement of the foot-pedal. The upper portion of the foot-pedal 17 having the hooked member 117 is pivoted on the lower portion to enable disengagement of the member 117 from the lug 115 and the consequent return of the foot-pedal upwardly to its normal release position.

The suppression magnet valve device 23 may comprise a casing having a chamber 121, which is constantly connected to the brake cylinder 11 by a portion of the pipe 68, and a double beat valve 122 which is contained in chamber 121 and yieldingly urged to an upper seated position on the casing by a coil spring 123 and to a lower seated position against the force of the spring 123 upon energization of an electromagnet 124. With the double beat valve 122 in its upper seated position as shown, communication is established from the chamber 121 to a chamber 126 in the casing which is constantly connected to the pressure chamber 67 in the control valve device 20 by another portion of the pipe 68. Thus, when the electromagnet 124 is deenergized, the brake cylinder 11 is connected to the pressure chamber 67 and consequently charged with fluid under pressure according to the pressure established in the pressure chamber 67. When the electromagnet 124 is energized and the double beat valve 21 is consequently in its lower seated position, the communication just described between the brake cylinder and the pressure chamber 67 is cut off and an exhaust communication for the brake cylinder 11 established from the chamber 121 to a chamber 127 which is constantly connected to the atmosphere through an exhaust port 128.

When the relay 24 associated with the dynamic braking circuit is in circuit-closing position, it connects one terminal of the battery 62, such as the positive terminal, to a wire 131 leading to one terminal of the electromagnet 124 of the suppression magnet valve device 23, the opposite terminal of the winding 124 being connected to the negative terminal of the battery 62 as through a ground connection as in the manner shown. It will thus be apparent that as long as the current in the dynamic braking circuit is sufficient to maintain the relay 24 in circuit-closing position, the brake cylinder 11 will be connected to atmosphere by way of the exhaust port 128 of the suppression magnet valve device 23 and, consequently, the fluid pressure brakes will remain released. When the current in the dynamic braking circuit falls below a certain uniform value so as to cause the relay 24 to be shifted to circuit-opening position, the consequent deenergization of the electromagnet winding 124 of the magnet valve device 23 results in the restoration of the communication between the brake cylinder 11 and the pressure chamber 67 of the control valve device 20. Thus, fluid under pressure is supplied to the brake cylinder 11 to effect application of the fluid pressure brakes according to the pressure established in the pressure chamber 67 of the control valve 20.

According to my present invention, the motor controller 25a is provided with a switch device which may comprise a contact segment 133 and an associated pair of contact fingers 134 and 135. The contact segment 133 is diagrammatically illustrated as carried on a rotary drum 136 which is fixed on an operating shaft 137 that is moved according to movement of an operating handle of the controller, shown removed. As a practical matter, the contact segment 103 will be carried in insulated relation on the controller drum of the motor controller 25a and shifted by operation of the handle of the controller.

The arrangement of the switch device comprising the contact segment 133 and contact fingers 134 and 135 is such that when the motor controller 25a is in "power-off" position, the contact segment 133 disengages the contact fingers 134 and 135. When the motor controller 25a is operated out of "power-off" position and toward "power-on" position, contact segment 133 engages contact fingers 134 and 135, thereby connecting a wire 138 leading to the positive terminal of the battery 62 and a wire 139 leading to the terminal of the electromagnet winding 124 of the suppression magnet valve device 23, and establishing a circuit in parallel with the relay 24 to effect energization of the electromagnet winding 124, independently of the relay 24. The electromagnet winding 124 is thus energized prior to the completion of the power circuit to motors 12 to 15 effected when the motor controller 25a is in "power-on" position to effect release of the fluid pressure brakes prior to the application of power to the propulsion motors and thus avoid high starting currents for the motors which would otherwise result from the drag of the brakes.

*Operation of the embodiment shown in Fig. 1*

Assuming that the reservoir 10 is charged to the normal pressure carried therein from a fluid compressor, not shown, and that the car is traveling along the road with power supplied to the propulsion motors 12 to 15 under the control of the motor controller 25, a service application of the brakes may be effected by the operator depressing the foot-pedal 17. As previously described, the power circuit for supplying current to the motors 12 to 15 is interrupted by the shifting of the segment 33 on the controller drum 22 and the dynamic braking circuit is established by the contact segment 35 on the controller drum. With the car traveling at a relatively high speed, the current flowing in the dynamic braking circuit exceeds that necessary to cause pick-up of the relay 24 and, consequently, the relay 24 is actuated to circuit-closing position to effect energization of the electromagnet 124 of the suppression magnet valve device 23.

Thus, although the depression of foot-pedal 17 effects the operation of the control valve device 20 to establish a pressure in the pressure chamber 67 corresponding to the degree through which the foot-pedal is depressed, the brake cylinder 11 remains connected to atmosphere under the control of the suppression magnet valve device 23 and the car is accordingly retarded under the effect of the dynamic brakes only.

Obviously, varying degrees of brake application and consequently varying rates of retardation in a service application may be attained by varying the degree through which the foot-pedal 17 is depressed, because with more or less of the dynamic braking resistor 37 cut in the dynamic braking circuit, a lesser or greater dynamic braking current will flow in the circuit, the degree of retardation effected by the dynamic brakes being dependent upon the current flowing in the dynamic braking circuit.

As is well understood in the art, the rate of retardation effected by dynamic brakes is substantially constant over a wide range of car speeds and falls off toward zero retardation only as the speed of the car reduces below a low degree. It will thus be apparent that by causing the relay 24 to remain in circuit-closing position in response to the flow of current in the dynamic braking circuit until the car reduces to a relatively low speed approaching a complete stop, the supply of fluid under pressure to the brake cylinder 11 and, consequently, the application of the fluid pressure brakes is suppressed until the car approaches a complete stop.

Now when the car reduces in speed due to the retarding effect of the dynamic brakes and approaches a stop, the relay 24 drops out, that is, shifts to circuit-opening position and effects deenergization of the electromagnet 124 of the suppression magnet valve device 23. Communication between the brake cylinder 11 and the pressure chamber 67 of the control valve device 20 is thus immediately established and fluid under pressure is supplied to the brake cylinder 11 to effect application of the fluid pressure brake according to the degree of pressure established in the pressure chamber 67. The fluid pressure brake is thus applied just prior to stopping of the car and remains applied as long as the foot-pedal 17 is depressed out of its normal position.

If, while the car or train is traveling along at a relatively high rate of speed, the operator desires to effect an emergency application of the brakes, he depresses the foot-pedal 17 a maximum degree to cause rotation of the controller drum 22 to emergency position. As in the previous instance, the power circuit to the motors 12 to 15 is interrupted by shifting of the segment 33 and the dynamic brake circuit is established by shifting of the contact segment 35. In the emergency position of the controller drum 22, contact segment 35 shunts out the entire dynamic braking resistor 37 and thus a maximum current will flow in the dynamic brake circuit to produce maximum retardation.

In the emergency position of the drum controller 22, the contact segment 61 establishes a circuit for energizing electromagnet 56 of the magnet valve device 21 and also a circuit for energizing the electromagnet 44 associated with the track brake shoes 43, the magnet winding 44 being energized by a maximum current due to the fact that the resistor 63 is entirely shunted out of the circuit by the contact segment 61. As a result of the energization of the electromagnet winding 56 of the magnet valve device 21, fluid under pressure is released from the cylinder 47 to atmosphere through exhaust port 69 of the magnet valve device 21 and thus the track shoes 43 fall into contact with the track rail. Due to the magnetic attraction between the track shoes 43 and the track rail 45 caused by energization of the electromagnet winding 44, a retarding force is exerted on the car or train.

As in a service application of the brakes, when the car or train reduces to a relatively low speed in approaching a complete stop, the relay 24 drops out, that is, shifts to circuit-opening position to effect deenergization of the electromagnet winding 124 of the suppression magnet valve device 23, which causes fluid under pressure to be supplied to the brake cylinder 11 to effect the application of the fluid pressure brake.

In order to release the brakes following either a service or an emergency application of the brakes, the operator releases the pedal 17 which is automatically restored to its normal release position. The operating lever 105 of the control valve device 20 is thus correspondingly restored to its normal position and the valve device 20 is operated to effect the release of fluid under pressure from the brake cylinder 11 and the consequent release of the fluid pressure brake. At the same time the electromagnet winding 44 on the track shoes 43 and the electromagnet 56 of the magnet valve device 21 are deenergized, thus causing restoration of the communication for the supply of fluid under pressure from the reservoir 10 to the cylinder 47 and resulting in the raising of the track shoes 43 out of contact with track rail 45.

Now, let it be supposed that the operator desires to back up the car or train as when housing the car or when entering a repair shop. In such case, the operator depresses the foot-pedal 17 and engages the hook member 117 thereon under the lug 115 to lock the foot-pedal in full service position. Assuming that the car is stopped at the time the application of the brakes is effected, the dynamic brake will be ineffective and thus with no current flowing in the dynamic braking circuit, the relay 24 is in circuit-opening position and effects deenergization of the electromagnet winding 124 of the suppression magnet valve device 23. The communication between the brake cylinder 11 and the pressure chamber 67 is thus opened and operation of the control valve device 20 by depression of the foot-pedal 17 to full service position is thus effective to establish a pressure in the brake cylinder 11 to effect a full service application of the fluid pressure brakes. It will be understood that a full service application of the fluid pressure brakes is sufficient to hold the car against creepage on any incline or grade on which the car stops.

The operator now removes the operating handle from the motor controller 25 at the head end of the car and, after going to the rear end of the car and placing the handle on the motor controller 25a, turns the handle from "power-off" position to "power-on" position. Before the power circuit to the propulsion motors 12 to 15 of the car is completed, the contact segment 133 connects the contacts fingers 134 and 135 and thus completes the circuit for energizing the electromagnet winding 124 of the suppression magnet valve device 23. Upon the energization of the electromagnet winding 124 of the suppression magnet valve device 23, the communication between the brake cylinder 11 and the pressure chamber 67 of the control valve device is closed and the exhaust communication for the brake cylinder 11 is established so that fluid under pressure is completely released from brake cylinder 11 through the exhaust port 128.

It will be noted that, as previously explained, the contact segment 61 on controller drum 22 is ineffective in the full service position of the foot-pedal 17 to cause application of the magnetic track brake device 16 and thus, as the fluid pressure brakes are released in the manner just described, the car is free to be driven by propulsion motors 12 to 15 under the control of the motor controller 25a.

When the car has been backed-up in the manner desired, the fluid pressure brakes are reapplied merely by restoring the handle of the motor controller 25a to "power-off" position, in which the contact segment 133 disengages the contact fingers 134 and 135 and thus effects deenergization of the electromagnet winding 124 of the suppression magnet valve device 23. As a result of the deenergization of the electromagnet winding 124, the magnet valve device 23 is operated to reestablish communication between the brake cylinder 11 and the pressure chamber 67 of the control valve device 20 so that fluid under pressure is again supplied to the brake cylinder 11 to the degree corresponding to a full service application.

Thereafter, if the operator desires to drive the car in a forward direction he removes the operating handle from the motor controller 25a and restores it to the motor controller 25 at the head end of the car. Then, before operating motor controller 25 to supply power current to the propulsion motors 12 to 15, the upper portion of the foot-pedal 17 is tilted in a forward direction to release the hook member 117 from the lug 115 and thus restore the foot-pedal 17 to its normal release position, wherein the control valve device 20 effects the complete release of fluid under pressure from brake cylinder 11 and, consequently, the complete release of the fluid pressure brakes.

Figure 3:
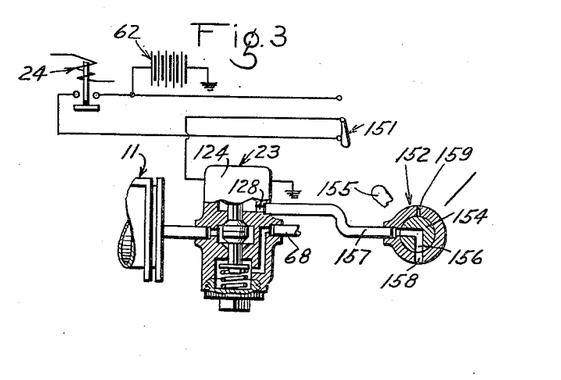
Fig. 3 is a fragmentary diagrammatic view, illustrating a modified embodiment of my invention as applied to the brake control equipment shown in Fig. 1.

*Embodiment shown in Fig. 3*

The embodiment shown in Fig. 3 differs from the embodiment shown in Fig. 1 in the provision of a single-pole double-throw switch 151, which may be of the knife or snap type, and in the provision of a manually operable valve device 152 indicated as of the plug type, for varying the rate of release of fluid under pressure from the brake cylinder 11 through the exhaust port 128 of the suppression magnet valve device 23.

The switch device 151 is effective, in one position and in series with the relay 24 associated with the dynamic braking circuit, to complete a circuit for effecting energization of the electromagnet winding 124 of the magnet valve device 23 and effective, in the other position, to open the circuit just described and establish another circuit for energizing the electromagnet 124 directly from the battery 62 independently of the relay 24. The switch device 151 is at the rear of the car and performs the same function as the switch device comprising the contact segment 133 and contact fingers 134 and 135 of the embodiment shown in Fig. 1, that is, effects release of fluid under pressure from the brake cylinder 11, from the rear end of the car, to enable back-up control of the propulsion motors of the car.

In cases where the car is stopped on an incline or grade with the foot-pedal 17 locked in full service position preparatory to backing-up the car, it is desirable to release the fluid pressure brake more slowly so that the fluid pressure brakes remain applied to a certain extent sufficient to hold the car from moving down the incline prior to the supply of current to the propulsion motors of the car to move the car up the incline. Excessive load on the propulsion motors while initiating the back-up movement may thus be obviated and overheating or burning out of the propulsion motors, due to excessive starting current which might otherwise occur, avoided. Accordingly, I provide the manually operated valve 152 which may comprise a plug valve 154 that is rotarily moved by an operating handle 155 and has a port or passage 156 therein effective in one position of the operating handle 155 to establish connection between a pipe 157, leading to the exhaust port 128 of the suppression magnet valve device 23, and a relatively large exhaust port 158 and effective in another position of the operating handle to close the exhaust port 158 and to establish connection from the pipe 157 to a relatively small or restricted exhaust port 159. The valve 152 is located at the rear of the car and is operated by the operator to either of the positions to vary the rate of exhaust of fluid under pressure from the brake cylinder 11, dependent upon the grade of the track upon which the car is stopped.

The embodiment shown in Fig. 3 being otherwise identical to that shown in Fig. 1, no further description of this embodiment is necessary.

Figure 4:
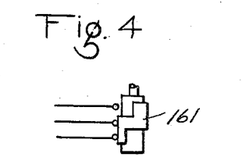

If desired, a switch device similar to that provided in Fig. 1 and automatically positioned according to the position of the motor controller 25a of the car may be provided in place of the switch 151 of Fig. 3 in the manner indicated in Fig. 4. Such a switch device may comprise a contact segment 161 which is positioned in the "power-off" position of the motor controller 25a to complete a circuit in series relation with the relay 24 for energizing the electromagnet winding 124 of the suppression magnet valve device 23. The segment 161 is further so designed that upon operation of the motor controller 25a to "power-on" position, the connection just described is interrupted and the positive terminal of the battery 62 is directly connected to the electromagnet 124 independently of relay 24.

Figure 5:
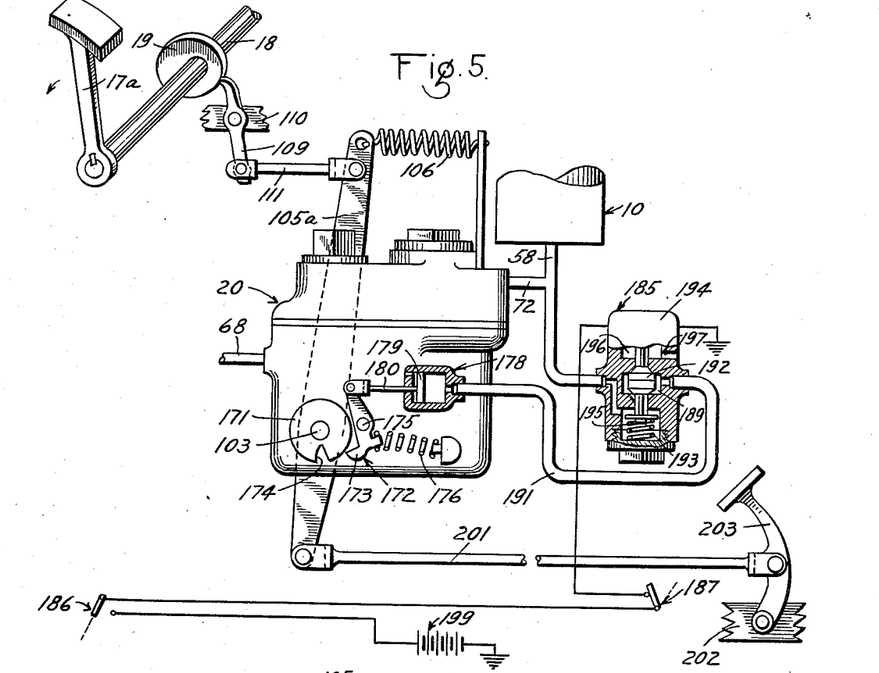

*Embodiment shown in Fig. 5*

Referring to Fig. 5, an embodiment of my invention is shown therein which differs from that shown in Fig. 1 essentially in the provision of a different type of means for locking the fluid pressure brakes in full service application position and for releasing the fluid pressure brakes from either end of the car.

As will be apparent in Fig. 5, the locking means comprises a collar or disc 171 fixed to the rotary operating shaft 103 of the control valve device 20 and a pawl lever 172 having a tooth 173 thereon for interlockingly engaging in a recess 174 in the periphery of the disc 171. The pawl lever 172 is pivoted, as by a pin 175, on the casing of the control valve device 20 and is shifted in a counterclockwise direction, against the yielding resisting force of a spring 176, to disengage the tooth 173 from the recess or notch 174 by means of a pressure cylinder 178, formed in or attached to the casing of the control valve device 20 and containing a piston 179 having a stem 180 which is pivotally connected to the pawl lever 172.

The notch 174 is so arranged on the disc 171 that when the rotary operating shaft 103 is rotated to a position corresponding to full service application position, the notch is aligned with the tooth 173 on the pawl lever 172 and permits entry of the tooth into the notch. As long as fluid under pressure is supplied to the pressure cylinder 178, the piston 179 is shifted in the left-hand direction so that the tooth 173 on the pawl lever 172 does not engage in the notch 174 on the collar 171. However, upon the release of fluid under pressure from the pressure cylinder 178, the spring 176 becomes effective to shift the pawl lever in a clockwise direction on the pin 175 and thus engage the tooth 173 in the notch 174. The notch 174 and the tooth 173 are so formed that while the tooth 173 is in the notch 174 movement of the rotary operating shaft 103 toward release position from the full service application position, under the influence of the spring 106, is prevented and at the same time rotation of the shaft 103 beyond full service position toward emergency position is not prevented.

The supply of fluid under pressure to and the release of fluid under pressure from the pressure cylinder 178 is under the control of a magnet valve device 185 which is under the joint control of a pair of switches 186 and 187 located at the head end and the rear end of the car respectively.

The magnet valve device 185 comprises a casing having a chamber 189 which is constantly connected to the pressure cylinder 178 as by a pipe 191, a double beat valve 192 being contained in the chamber and urged to an upper seated position by a spring 193 and to a lower seated position, upon energization of an electromagnet winding 194, against the yielding resisting force of spring 193. When the double beat valve 192 is in the upper seated position it establishes communication past the lower valve seat from the chamber 189 to a chamber 195 which is constantly connected to and charged with fluid under pressure from the reservoir 10 through pipe 58, thus causing fluid under pressure to be supplied from the reservoir to the pressure cylinder. When the valve 192 is in its lower seated position, the supply communication just described is closed and a communication is established past the upper valve seat from the chamber 189 to a chamber 196 which is constantly open to atmosphere through an exhaust port 197, thereby causing fluid under pressure to be released to atmosphere through the port 197 from the pressure cylinder 178.

The switch 186 at the head end of the car or train is normally in open position and switch 187 at the rear end of the car is normally in closed position. The two switches 186 and 187 are connected in series relation and are effective, when both are in closed position, to complete the simple circuit shown for supplying energizing current to the electromagnet 194 of the magnet valve device 185 from a source of current, such as the battery 199.

In view of the provision of the locking mechanism of the control valve device 20 including the collar 171 and pawl lever 172 the necessity for the arrangement for locking the foot-pedal on the shaft 18 in full service position as in Fig. 1, is obviated and thus a simple rigid foot-pedal 17a is provided on the shaft 18.

In order to effect operation of the control valve device 20 from the rear end of the car, an operating lever 105a corresponding to the lever 105 in the embodiment shown in Fig. 1 is provided, the lever 105a being fixed intermediate its ends to the rotary operating shaft 103 of the control valve device 20 and the lower end of the lever 105a being connected by a rod 201 to a foot-pedal 203 at the rear of the car, which pedal is pivoted on a fixed part 202 of the vehicle such as the frame.

In operation, when it is desired to control the propulsion motors of the car from the rear end thereof as in backing-up, the operator first depresses the pedal 17a to effect a full service application of the fluid pressure brakes and then closes the switch 186. The closing of the switch 186 completes a circuit for energizing the electromagnet winding 194 of the magnet valve device 185 which is accordingly operated to vent fluid under pressure from the pressure cylinder 178 and cause the tooth 173 on the pawl lever 172 to be actuated into interlocking relation in the notch 174 of the disc 171 fixed to the rotary shaft 103. Thereafter, the operator may remove his foot from the brake pedal 17a and the fluid pressure brakes will remain applied.

He may then remove the handle from the motor controller 25 at the head end of the car, and, after going to the rear end of the car, place the handle on the motor controller 25a at the rear end of the car. Prior to operating the motor controller 25a at the rear end of the car to "power-on" position, the operator may release the fluid pressure brake merely by opening the switch 187. The opening of the switch 187 effects deenergization of the electromagnet 194 of the magnet valve device 185 which is thus operated to establish communication through which fluid under pressure is supplied to the pressure cylinder 178. The pawl lever 172 is thus rocked to disengage the tooth 173 from the notch 174, and the spring 106 then becomes effective to return the operating shaft 103 of the control valve device 20 to the release position to effect the complete exhaust of fluid under pressure from the brake cylinder 11 and the consequent release of the fluid pressure brakes.

After moving the car under the control of the motor controller at the rear of the car, the operator may reapply the fluid pressure brakes by depressing the foot-pedal 203 at the rear of the car sufficiently to effect a full service application of the brakes. Then, while holding the foot-pedal 203 in such position, he may operate the switch 187 to closed position to effect reenergization of the electromagnet winding 194 of the magnet valve device 185, which is accordingly operated to release fluid under pressure from the pressure cylinder 178. Pawl lever 172 is thus rocked to interlockingly engage the tooth 173 in the notch 174 on the collar 171. The foot-pedal 203 may now be released and the fluid pressure brakes will remain applied.

Thereafter, the operator may remove the handle from the motor controller 25a at the rear end of the car and return it to the motor controller 25 at the head end of the car. In order to release the fluid pressure brakes, prior to again moving the car under the control of the motor controller 25 at the head end of the car, the operator merely opens the switch 186 at the head end of the car to effect deenergization of the electromagnet winding 194 of the magnet valve device 185. Valve device 185 is thus operated to again supply fluid under pressure to the pressure cylinder 178 and thereby effect disengagement of the tooth 173 on the pawl lever 172 from the notch 174 to permit the control valve device 20 to exhaust fluid under pressure from the brake cylinder and effect the complete release of the fluid pressure brakes.

Figure 6:
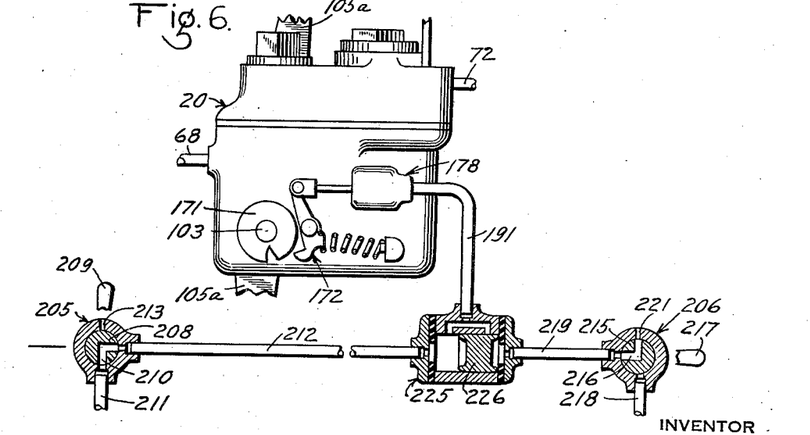

A modification of the embodiment shown in Fig. 5 may be provided as shown in Fig. 6, in which the supply and the release of fluid under pressure from the pressure cylinder 178 for releasing and locking the rotary operating shaft 103 of the control valve device 20 is effected by means of two manually operated valve devices 205 and 206 located at the head end and the rear end of the car, respectively.

The valve device 205 comprises a plug valve 208 which is rotarily shifted by an operating handle 209 to a supply position in which a port or passage 210 therein connects a supply pipe 211 to a delivery pipe 212 and to an exhaust position in which the port 210 connects the delivery passage 212 to an atmospheric exhaust port 213.

In a similar manner, the valve device 206 may comprise a plug valve 215 having a port 216 therein and operated by an operating handle 217 to a supply position in which the port 216 connects a supply pipe 218 to a delivery pipe 219 and to an exhaust position in which the port 216 connects the delivery pipe 219 to an atmospheric exhaust port 221.

A double check valve device 225 of conventional type is provided, having a piston 226 which is shifted to extreme positions in opposite directions depending upon whether fluid under pressure is supplied into the delivery pipe 212 or pipe 219 to establish a connection between the delivery pipe 212 or 219 and the pipe 191 leading to the pressure cylinder 178.

Normally the plug valve 208 of the valve device 205 is turned to supply position to cause fluid under pressure to be supplied from the supply pipe 211 into the delivery pipe 212. At the same time, the plug valve 215 of the valve device 206 is turned to the exhaust position for exhausting fluid under pressure from the delivery pipe 219 through the exhaust port 221. The valve piston 226 of the double check valve 225 is accordingly shifted in the right-hand direction to a position for establishing connection between the delivery pipe 212 and the pipe 191 so that fluid under pressure is accordingly supplied to the pressure cylinder 178 to effect disengagement of the tooth 173 on the pawl lever 172 from the notch 174 in the collar 171 and thus to permit operation of the control valve device 20 by the foot-pedals 17a or 203, at opposite ends of the car, through the medium of the operating lever 105a.

When it is desired to control the propulsion motors from the rear end of the car, the operator first depresses the foot-pedal 17a, see Fig. 5, to effect a full service application of the fluid pressure brakes and then turns the operating handle 209 of the valve device 205 to exhaust position, in which fluid under pressure is released from the pressure cylinder 178 by way of exhaust port 213.

Upon the release of fluid under pressure from the pressure cylinder 178 in the manner described, the pawl lever 172 is actuated to engage the tooth 173 into notch 174 of the collar 171 to lock control valve device 20 in the full service application position. The operator may then go to the rear of the car and effect release of the fluid pressure brakes, prior to supplying power current to the propulsion motors, by turning the valve 215 of the valve device 206 to supply position. Fluid under pressure is thus supplied from the supply pipe 218 to delivery pipe 219 and thence by way of the double check valve device 225 to pipe 191 and the pressure cylinder 178, to effect the disengagement of the tooth 173 on the pawl lever 172 from the notch 174 on the collar 171. The control valve device 20 is automatically turned to release position by the spring 106 to effect release of the fluid pressure brakes.

When it is desired to reapply the fluid pressure brakes from the rear end of the car, the operator depresses the foot-pedal 203, see Fig. 5, to effect a full service application of the brakes and then shifts the valve 215 of the valve device 206 to exhaust position in which fluid under pressure is released from the pressure cylinder 178 through the exhaust port 221 of the valve device 206. The tooth 173 on the pawl lever 172 is thus shifted into interlocking engagement in the notch 174 on the collar 171 to hold the control valve device 20 in full service application position while the operator proceeds to the front end of the car. To release the brakes from the head end of the car, the operator turns the valve 208 of the valve device 205 to supply position to again supply fluid under pressure from the supply pipe 211 to the pressure cylinder 178, the pawl lever 172 being correspondingly shifted to disengage the tooth 173 from the notch 174 in the collar 171 so that the brakes are correspondingly released.

Figure 7:
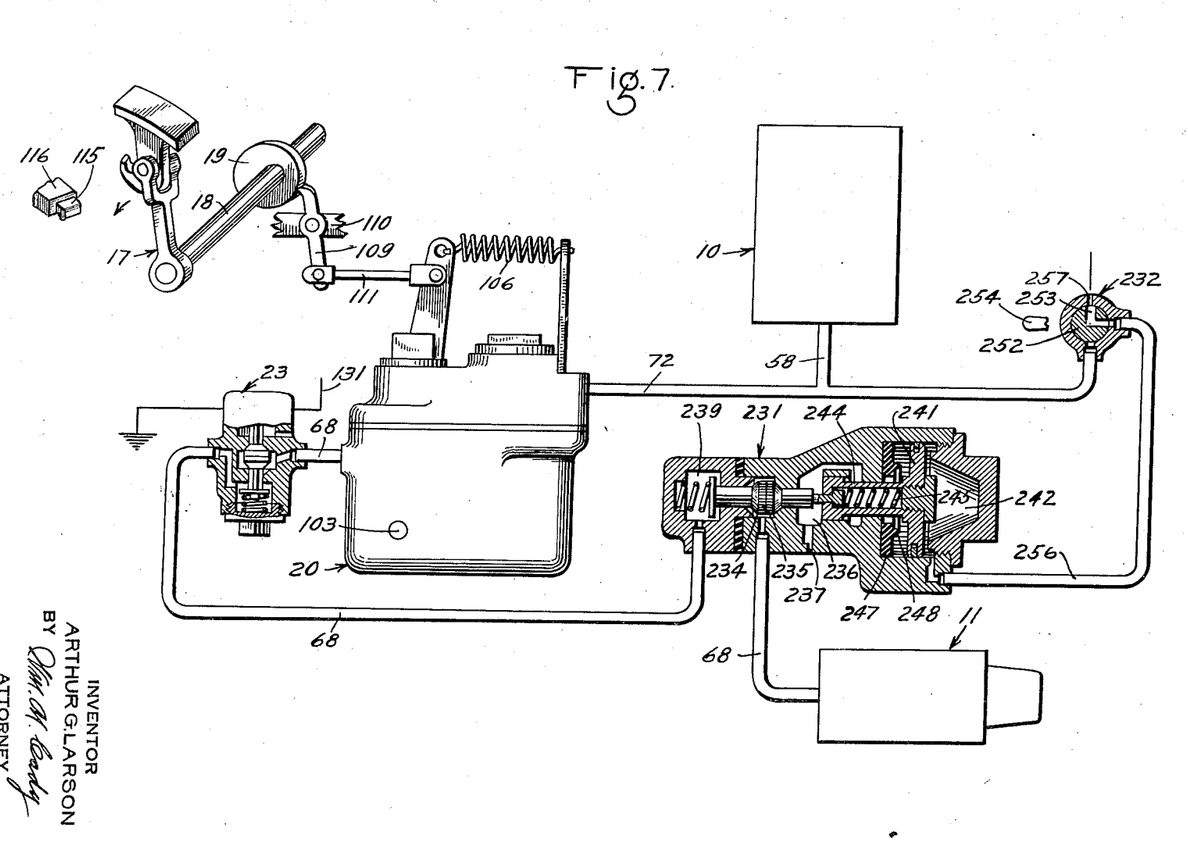

*Embodiment shown in Fig. 7*

Referring to Fig. 7, another embodiment of my invention is shown which differs from that shown in Fig. 1 in omitting the control of the suppression magnet valve device 23 from the rear end of the car and in the provision of a cut-off and release valve device 231 in the pipe 68 leading from the suppression magnet valve device 23 to the brake cylinder 11, and a manually operable control valve 232 for controlling the operation of the valve device 231.

The valve device 231 may comprise a casing having a chamber 234 which is constantly connected to the brake cylinder 11 by one portion of the pipe 68 and which contains a double beat valve 235. The double beat valve 235 is yieldingly biased normally in the right-hand direction into seated relation on an associated valve seat to close communication from the chamber 234 to a chamber 236 which is constantly open to atmosphere through an exhaust port 237, communication being simultaneously established past the opposite valve seat from the chamber 234 to a chamber 239 constantly connected to the magnet valve device 23 by another portion of the pipe 68.

The double beat valve 235 is shifted in the left-hand direction into seated relation on its associated valve seat, to close off the connection between the chambers 234 and 239 and to simultaneously open communication between the chamber 234 and the chamber 236, by a piston 241 upon the supply of fluid under pressure to a chamber 242 at one side of the piston. The piston 241 is provided with a hollow stem 244 and the stem at one side of the double beat valve is slidably received therein. A spring 245 is interposed in the hollow stem 244 between the end of the stem of the double beat valve and the piston 241 to permit relative movement between the valve 235 and the piston 241 after the piston 241 seats the valve.

In order to prevent leakage of fluid under pressure past the piston 241 from the chamber 242, an annular gasket 247 is provided at the left-hand side of the piston 241, the gasket having an annular rib seat 248 which is engaged by the piston 241 substantially at the time the valve 235 seats on its associated valve seat in the left-hand position.

The supply of fluid under pressure to the chamber 242 of the valve device 231 and its release therefrom is under the control of the manually operable valve device 232. The valve device 232 may comprise a plug valve 252 which has a port 253 therein and which is shifted by an operating handle 254 to a supply position in which the port 253 connects pipe 72, leading to the reservoir 10, to a pipe 256 leading to the chamber 242 of the valve device 241. When the valve 252 is shifted to an exhaust position, port 253 connects the pipe 256 to an exhaust port 257.

In operation, when the operator desires to control the car motors from the rear end of the car, he depresses the foot-pedal 17 and engages the hook member 117 under the lug 115 to lock the pedal in full service application position. The control valve device 20 is accordingly operated to supply fluid under pressure to the brake cylinder 11 in the manner previously described for Fig. 1. It will be recalled from the description of the embodiment shown in Fig. 1 that with the car stopped, the suppression magnet valve device 23 opens communication through the pipe 68 from the control valve device 20 to the brake cylinder 11.

When the operator desires to release the brakes from the rear end of the car, he turns the valve 252 of the valve device 232 from the normal exhaust position to the supply position in which fluid under pressure is supplied from the reservoir 10 to the chamber 242 of the valve device 231. Accordingly, the double beat valve 235 is shifted in the left-hand direction to close off the connection between the suppression valve device 23 and the brake cylinder 11 and at the same time to open an exhaust communication from the portion of pipe 68 connected to the brake cylinder to the atmospheric exhaust chamber 237. Fluid under pressure is accordingly released from the brake cylinder 11 to effect release of the brakes but, at the same time, fluid under pressure is maintained in the pressure chamber 67 of the control valve device 20.

When it is desired to effect reapplication of the brakes from the rear end of the car, the operator shifts the valve 252 of the valve device 232 to exhaust position and fluid under pressure is accordingly released from the chamber 242 of the valve device 231 to atmosphere through the exhaust port 257 of valve device 232. The double beat valve 235 is accordingly shifted in the right-hand direction back to seated position to close off the connection from the brake cylinder to the atmospheric exhaust chamber 236 and to open communication from the brake cylinder to the intermediate portion of pipe 68 leading to the suppression magnet valve device 23. Fluid under pressure is accordingly again supplied from the pressure chamber 67 of the control valve device 20 to the brake cylinder 11 to reapply the fluid pressure brakes.

When the operator returns to the head end of the car, he may effect release of the fluid pressure brakes by unhooking the foot-pedal 17 from the lug 115, thereby allowing the control valve device 20 to be returned to release position to effect exhaust of fluid under pressure from the brake cylinder 11 and the consequent release of the brakes.

*Summary*

Summarizing, it will be seen that I have disclosed a plurality of embodiments of my invention for a car brake equipment comprising a fluid pressure brake and one or more types of electrical brakes, whereby the fluid pressure brakes may be controlled in a relatively simple manner from the rear of the car.

In the embodiment shown in Fig. 1 and in modifications thereof shown in Figs. 3 and 4, a suppression magnet valve device which is controlled automatically by the dynamic brake to suppress the fluid pressure brake until the dynamic brake is substantially ineffective upon the vehicle coming to a complete stop, is controlled from the rear end of the car, thereby enabling application and release of the fluid pressure brakes.

In the embodiments shown in Figs. 5 and 6, a locking mechanism is provided for locking the brake control valve device in application position, the locking mechanism being controllable from both the head and rear ends of the car.

In the embodiment shown in Fig. 7, a cut-off and release valve device is provided in the pipe leading to the brake cylinder, the operation of the said cut-off and release valve device being under the control of a manually operated valve device at the rear end of the car.

While certain specific embodiments of my invention have been shown and described, it will be apparent that various omissions, additions or modifications may be effected without departing from the spirit of my invention. It is accordingly not my intention to limit the scope of my invention except as it is necessitated by the scope of the prior art.

Having now described my invention, what I claim as new and desire to secure by Letters Patent, is:

1. In a car brake system, in combination, a brake cylinder, valve means including an operating element shiftable different degrees out of a normal position, the valve means being effective to cause fluid under pressure to be supplied to the brake cylinder to establish a pressure therein corresponding substantially to the degree of displacement of the operating element out of its normal position, means at one end of the car for causing said operating element to be held in a displaced position, a magnet valve device effective in one position to establish communication through which fluid under pressure is supplied from the valve means to the brake cylinder and effective in a different position to close said communication and establish a different communication through which fluid under pressure is released from the brake cylinder, and switch means at the opposite end of the car for controlling said magnet valve device.

2. In a car brake system, in combination, a brake cylinder, valve means including an operating element shiftable different degrees out of a normal position, the valve means being effective to cause fluid under pressure to be supplied to the brake cylinder to establish a pressure therein corresponding substantially to the degree of displacement of the operating element out of its normal position, means at one end of the car for causing said operating element to be held in a displaced position, a valve device effective in one position to establish communication through which fluid under pressure is supplied from the valve means to the brake cylinder and effective in a different position to close said communication and establish a different communication through which fluid under pressure is released from the brake cylinder, means at the opposite end of the car for controlling said valve device, and means adjacent said last means for selectively varying the rate of release of fluid under pressure from the brake cylinder when effected by the said valve device.

3. A car brake system comprising, in combination, fluid pressure brake means, manually operable means for controlling application and release of said fluid pressure brake means, a traction motor for the car connectable as a generator in a dynamic braking circuit to effect dynamic braking of the car, manually operable means operative to cause said motor to be connected as a generator in the dynamic braking circuit, means for maintaining the fluid pressure brake means released notwithstanding operation of the manually operable means to effect application of the fluid pressure brake means as long as the current in the dynamic braking circuit exceeds a certain uniform value and effective automatically when the dynamic braking current reduces below said uniform value for effecting application of the fluid pressure brake means, and independent means for controlling said last means to effect release of the fluid pressure brakes when the dynamic braking current is below said certain uniform value notwithstanding that the manually operable means is operated to effect application of the fluid pressure brake means.

4. A car brake system comprising, in combination, fluid pressure brake means, traction motors for the car connectable as generators in a dynamic braking circuit to effect dynamic braking of the car, a motor controller at each end of the car for controlling the supply of propulsion power to said motors, manually operable means operative to cause said car motors to be connected as generators in the dynamic braking circuit, means for maintaining the fluid pressure brake means released as long as the dynamic braking current exceeds a certain uniform value and effective automatically when the dynamic braking current reduces below said certain uniform value for effecting application of the fluid pressure brake means, one of said motor controllers being effective to control said last means to effect the release of the fluid pressure brake means upon operation thereof to supply propulsion power to said motors.

5. A car brake system comprising, in combination, fluid pressure brake means, traction motors for the car connectable as generators in a dynamic braking circuit to effect dynamic braking of the car, a motor controller at each end of the car for controlling the supply of propulsion power to said motors, manually operable means operative to cause said car motors to be connected as generators in the dynamic braking circuit, means for maintaining the fluid pressure brake means released as long as the dynamic braking current exceeds a certain uniform value and effective automatically when the dynamic braking current reduces below said certain uniform value for effecting application of the fluid pressure brake means, one of said motor controllers being effective to control said last means to effect release of the fluid pressure brake as long as the motor controller is conditioned to supply power to said motors.

6. In a car brake system, traction motors for the car connectable as generators in a dynamic braking circuit to effect dynamic braking of the car, a motor controller at each end of the car for controlling the supply of power to said motors, a brake cylinder, valve means operative to cause fluid under pressure to be supplied to the brake cylinder to effect application of the fluid pressure brakes, manually operable means operative to connect said motors as generators in the dynamic braking circuit and at the same time to operate said valve means to cause fluid under pressure to be supplied to the brake cylinder, a magnet valve device effective in one position to establish communication through which fluid under pressure is supplied from the said valve means to the said brake cylinder and in a different position to close said communication and establish a release communication through which fluid under pressure is vented from the brake cylinder, means controlled according to the current in the dynamic braking circuit for controlling said magnet valve device to prevent the supply of fluid under pressure to the brake cylinder from the said valve means as long as the dynamic braking current exceeds a certain uniform value, and switch means associated with one of said motor controllers and effective to control said magnet valve device so as to prevent the supply of fluid under pressure to the brake cylinder and to release fluid under pressure therefrom upon operation of the said one motor controller to supply power to said motors.

7. In a car brake system, traction motors for the car connectable as generators in a dynamic braking circuit to effect dynamic braking of the car, a motor controller at each end of the car for controlling the supply of power to said motors, a brake cylinder, valve means operative to cause fluid under pressure to be supplied to the brake cylinder to effect application of the fluid pressure brakes, manually operable means operative to connect said motors as generators in the dynamic braking circuit and at the same time to operate said valve means to render it potentially effective to cause fluid under pressure to be supplied to the brake cylinder, a magnet valve device effective in one position to establish communication through which fluid under pressure is supplied from the said valve means to the said brake cylinder and in a different position to close said communication and establish a release communication through which fluid under pressure is vented from the brake cylinder, means controlled according to the current in the dynamic braking circuit for controlling said magnet valve device to prevent the supply of fluid under pressure to the brake cylinder from the said valve means as long as the dynamic braking current exceeds a certain uniform value, switch means associated with one of said motor controllers and effective to control said magnet valve device so as to prevent the supply of fluid under pressure to the brake cylinder and release fluid under pressure therefrom upon operation of the motor controller to supply power to said motors, and manually operable means for controlling the rate of release of fluid under pressure from the brake cylinder as effected by the said magnet valve device.

8. In a car brake system, traction motors for the car connectable as generators in a dynamic braking circuit to effect dynamic braking of the car, a motor controller at each end of the car for controlling the supply of power to said motors, a brake cylinder, valve means operative to cause fluid under pressure to be supplied to the brake cylinder to effect application of the fluid pressure brakes, manually operable means operative to connect said motors as generators in the dynamic braking circuit and at the same time to operate said valve means to cause fluid under pressure to be supplied to the brake cylinder, a magnet valve device effective in one position to establish communication through which fluid under pressure is supplied from the said valve means to the said brake cylinder and in a different position to close said communication and establish a release communication through which fluid under pressure is vented from the brake cylinder, means controlled according to the current in the dynamic braking circuit for controlling said magnet valve device to prevent the supply of fluid under pressure to the brake cylinder from the said valve means as long as the dynamic braking current exceeds a certain uniform value, switch means associated with one of said motor controllers and effective to control said magnet valve device so as to prevent the supply of fluid under pressure to the brake cylinder and to release fluid under pressure therefrom upon operation of the motor controller to supply power to said motors, and manually operable means adjacent said one motor controller for varying the rate of release of fluid under pressure from the brake cylinder as effected by said magnet valve device.

9. In a car brake system, in combination, a brake cylinder, self-lapping valve means operative to cause fluid under pressure to be supplied to the brake cylinder to effect application of fluid pressure brakes, traction motors for the car connectable as generators in a dynamic braking circuit, a manually operable element normally in a brake release position and operative out of brake release position to simultaneously connect the traction motors to operate as generators in the dynamic braking circuit and to effect operation of the self-lapping valve means, locking means for holding said manually operable control element in application position, a magnet valve device effective as long as the current in the dynamic braking circuit exceeds a certain uniform value for preventing the supply of fluid under pressure from the self-lapping valve means to the brake cylinder and effective at the same time to establish communication through which fluid under pressure is exhausted from the brake cylinder and operative when the dynamic braking current reduces below said certain uniform value during an application of the brakes for closing the exhaust communication and establishing communication through which fluid under pressure is supplied from the self-lapping valve means to the brake cylinder, and independently operable means for controlling the said magnet valve device to cause the release of fluid under pressure from the brake cylinder notwithstanding that the said manually operable control element is maintained in application position by said locking means.

10. In a car brake system, in combination, self-lapping valve means including an operating element normally yieldingly biased to a certain position to cause the valve means to release fluid under pressure from the brake cylinder, means at each end of the car for effecting displacement of said operating element out of its normal position to cause the valve means to operate to supply fluid under pressure to the brake cylinder, fluid pressure operated means normally in a position to permit return of said operating element from a displaced position to the release position and effective upon a variation of fluid under pressure acting thereon to cooperatively engage the operating element to prevent its return from a displaced position to release position and thereby cause the valve means to maintain a certain fluid pressure in the brake cylinder, a magnet valve device for controlling the pressure on said fluid pressure operated means, and two series-connected switch devices located respectively at opposite ends of the car for controlling the circuit on which said magnet valve device operates.

11. In a car brake system, in combination, a brake cylinder, valve means operative to cause fluid under pressure to be supplied to the brake cylinder to effect an application of the brakes, a dynamic brake, a valve device effective as long as said dynamic brake is effective above a predetermined degree to prevent the supply of fluid under pressure from said valve means to the brake cylinder and to establish a communication through which fluid under pressure is released from the brake cylinder and operative when the dynamic brake reduces in effectiveness below said certain predetermined degree for closing said exhaust communication and opening communication through which fluid under pressure is supplied from said valve means to the brake cylinder, a second valve device normally establishing communication through which fluid under pressure is supplied from the first said valve device to the brake cylinder and operative to prevent the supply from the first said valve device to the brake cylinder and to establish a communication through which fluid under pressure is released from the brake cylinder, and manually controlled means for controlling the operation of said second valve device.

12. In a car brake system, in combination, a brake cylinder, valve means operative to cause fluid under pressure to be supplied to the brake cylinder to effect an application of the brakes, a dynamic brake, a valve device effective as long as said dynamic brake is effective above a predetermined degree to prevent the supply of fluid under pressure from said valve means to the brake cylinder and to establish a communication through which fluid under pressure is released from the brake cylinder and operative when the dynamic brake reduces in effectiveness below said certain predetermined degree for closing said exhaust communication and opening communication through which fluid under pressure is supplied from said valve means to the brake cylinder, a fluid pressure operated valve device having a normal position in which it establishes communication through which fluid under pressure is supplied from the said valve device to the brake cylinder and operative upon a variation of fluid under pressure acting thereon to another position in which it closes the supply communication to the brake cylinder from the said valve device and establishes an exhaust communication through which fluid under pressure is released from the brake cylinder, and a manually operable valve device for controlling the pressure on said fluid pressure operated valve device.

13. A car brake system comprising, in combination, fluid pressure brake means, manually operable means for controlling application and release of the fluid pressure brake means, a traction motor for the car connectable as a generator in a dynamic braking circuit to effect dynamic braking of the car, manually operable means operative to cause said motor to be connected as a generator in the dynamic braking circuit, magnet valve means including an electromagnet and effective as long as said electromagnet is energized in excess of a certain degree for maintaining the fluid pressure brake means released notwithstanding operation of the manually operable means to effect application of the fluid pressure brake means and effective when said electromagnet is deenergized to cause application of the fluid pressure brake means when the manually operable means is operated to effect application of the fluid pressure brake means, means controlled by the current in the dynamic braking circuit for causing energization of said electromagnet in excess of said certain degree only so long as the current in the dynamic braking circuit exceeds a certain uniform value and for causing deenergization of said electromagnet when the current in the dynamic braking circuit reduces below said certain uniform value, and independent means for effecting energization of the said electromagnet to cause release of the fluid pressure brakes notwithstanding that the current in the dynamic braking circuit is less than said certain uniform value and that the manually operable means is operated to effect application of the fluid pressure brake means.

ARTHUR G. LARSON.